United States Patent [19]

Naël

[11] 4,379,627
[45] Apr. 12, 1983

[54] TRAY FOR STORING AND CLASSIFYING SLIDES AND A VIEWER FOR SLIDES DISPOSED IN SUCH TRAYS

[75] Inventor: Albert Naël, Sainte Genevieve des Bois, France

[73] Assignee: Compagnie Generale d'Automatisme CGA Alcatel, Paris, France

[21] Appl. No.: 294,275

[22] Filed: Aug. 19, 1981

[30] Foreign Application Priority Data

Sep. 9, 1980 [FR] France .................. 80 19406

[51] Int. Cl.³ .................. G03B 23/08
[52] U.S. Cl. .................. 353/27 A; 353/113; 353/114; 353/120; 206/456
[58] Field of Search .................. 353/83, 86, 89, 90, 353/92, 93, 118, 25, 27 A, 27 R, 103, 112, 113, 114, 116, 117, 120; 206/455, 456, 804, 449, 454, 555; 271/3.1, 312, 8 A, 247, 250, 252, 264, 268, 306; 211/41; 312/9; 40/476, 124, 124.4, 361

[56] References Cited

U.S. PATENT DOCUMENTS

| | | | |
|---|---|---|---|
| 2,628,092 | 2/1953 | Malmros et al. | 271/268 |
| 2,942,365 | 6/1960 | Badalich | 206/456 |
| 3,083,960 | 4/1963 | Coronado et al. | 271/4 |
| 3,187,890 | 6/1965 | Brown | 206/456 |
| 3,508,484 | 4/1970 | Hickey | 206/455 |
| 3,528,735 | 9/1970 | Bluitt et al. | 353/27 A |
| 3,563,646 | 2/1971 | Harvey | 353/83 |
| 3,623,803 | 11/1971 | Ganz | 353/103 |
| 4,049,342 | 9/1977 | Hearon | 353/27 R |
| 4,101,027 | 7/1978 | Kohl et al. | 206/455 |
| 4,204,754 | 5/1980 | Asanuma et al. | 353/118 |

FOREIGN PATENT DOCUMENTS 2306153 8/1974 Fed. Rep. of Germany.
2343671 3/1975 Fed. Rep. of Germany.

*Primary Examiner*—Stephen Marcus
*Assistant Examiner*—William R. Sharp
*Attorney, Agent, or Firm*—Sughrue, Mion, Zinn, Macpeak & Seas

[57] ABSTRACT

The invention relates to a parallelepipedic tray intended to accommodate slides (7) which are to be viewed. The tray mainly comprises an upper wall (1) and a lower wall (2) each of which has grooves (6). The slides can be inserted in or removed from the tray via either of two open side surfaces, and to prevent the slides from dropping out when the tray is being handled, the tray has two flaps (8 and 9). Such a tray can be used on a slides viewer which has two carriages (22 and 23) to support and guide the trays, which carriages are disposed symmetrically on either side of optical system (28).

6 Claims, 6 Drawing Figures

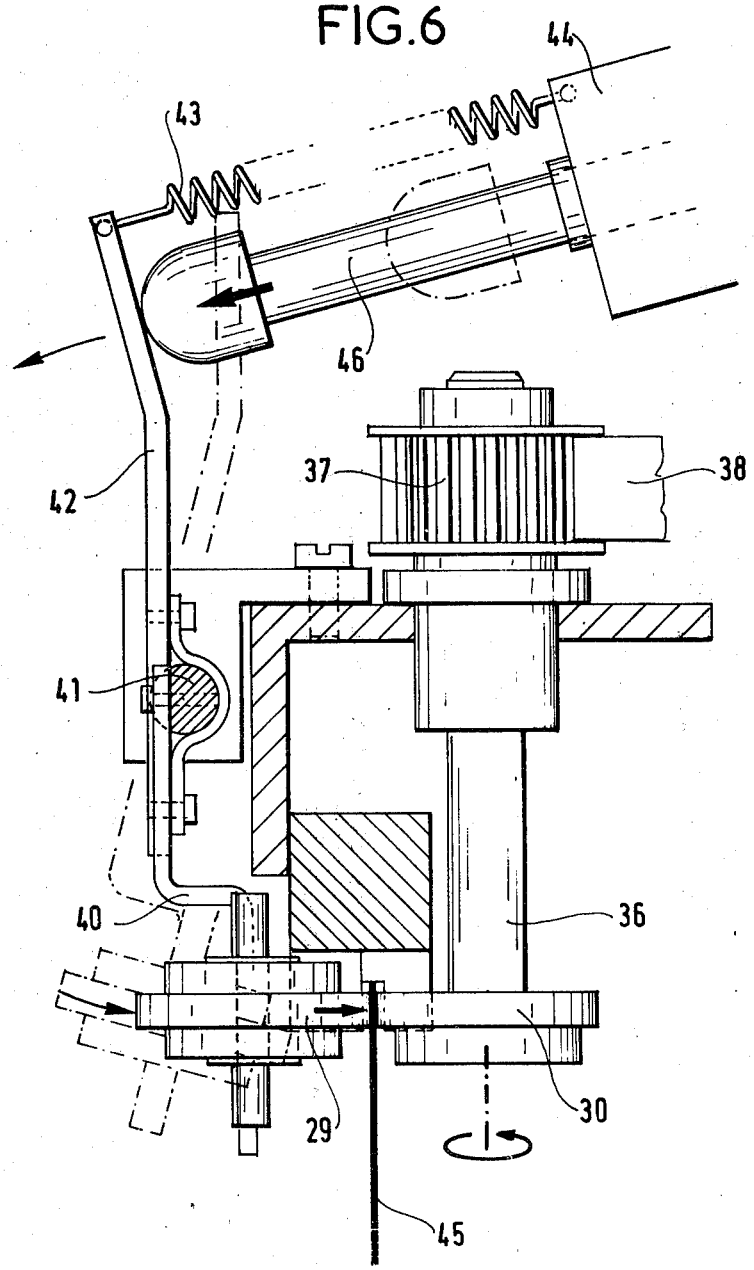

TRAY FOR STORING AND CLASSIFYING SLIDES AND A VIEWER FOR SLIDES DISPOSED IN SUCH TRAYS

The present invention relates to a tray for storing and classifing slides.

BACKGROUND OF THE INVENTION

Slides means any plane, optically-readable data medium. However, to be more specific, the present invention is described, by way of example, with reference to apparatus using slides of the kind known as "microfiches".

Besides storing and classifying slides, a tray in accordance with the invention is intended to co-operate directly with a slide viewer.

Preferred embodiments of the invention provide a large-capacity tray which may be associated with a slide viewer for projecting an enlarged portion of a slide on a screen and also for automatic classification of slides by changing over from one tray to another.

SUMMARY OF THE INVENTION

The present invention provides a tray for storing and classifying slides, said tray comprising parallel, plane, top and bottom members held in fixed relationship to each other and provided with corresponding sets of transverse, slide-receiving grooves in their facing surfaces, wherein the tray is symmetrical about a longitudinal plane passing through the mid points of both sets of grooves and has open left and right sides via which slides may be inserted in or removed from the tray, and wherein at least one of said top and bottom members is provided with two, symmetrically disposed, independently movable side flaps, each flap having a first, open position in which it allows slides to be inserted or removed via its side of the tray, and a second, closed position in which it prevents insertion or removal via said side.

Advantageously, a tray according to the invention is intended to co-operate with a slide viewer and each flap is provided with a push rod which extends through the bottom member of the tray to co-operate with flap-operating means provided in the viewer's tray support.

Preferably, the tray is provided with two positioning means for locating the tray on the viewer's tray support: first positioning means comprising a stud and a co-operating stud-receiving socket for coarse positioning; and second positioning means comprising a permanent magnet and a co-operating metal plate for holding the tray firmly on the support against the play inherent in the stud and socket positioning means.

The invention also provides a viewer for reading slides disposed in trays as defined above, wherein the viewer includes two carriages each of which can accommodate one tray, the carriages being movable in translation along two parallel paths disposed on either side of optical means which allow the slides to be viewed, the viewer including means to remove the slides from the trays and to move them horizontally past the optical system, together with means to move the optical system vertically past the slide.

The means for horizontally moving a slide may include two rotatable roller rows at least one of which is a drive row the two rows being able to straddle a slide in the neighbourhood of its upper edge and a stationary horizontal slideway in which the lower edge of the slide is engaged.

Advantageously means are provided to move the two rows of rollers apart, these means being brought into use when the slides are to be viewed.

BRIEF DESCRIPTION OF THE DRAWINGS

An embodiment of the invention is described, by way of example with reference to the accompanying drawings in which:

FIG. 6 shows a detail along a cross-section VI—VI of FIG. 5 illustrating means for moving rows of rollers apart from one another other.

DESCRIPTION OF PREFERRED EMBODIMENT

Figure 1:
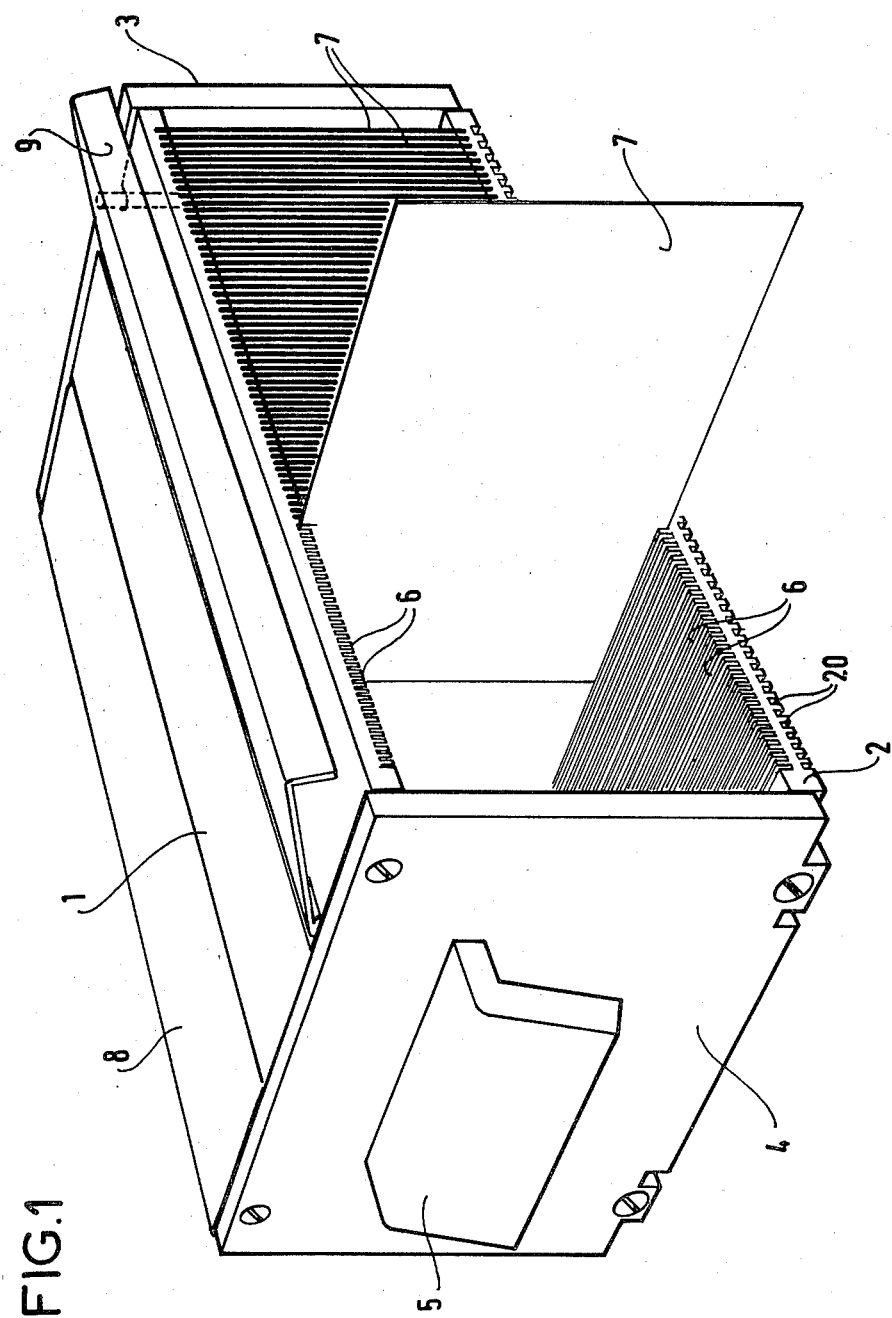
FIG. 1 is a perspective view of a tray in accordance with the invention.

FIG. 1 illustrates a tray in accordance with the invention. The tray has two opposite parallel surfaces—an upper wall 1 and a lower wall 2. These two surfaces are held stationary relative to each other by means of a back wall 3 and a front wall 4 on which a handle 5 is fixed. The facing surfaces of upper and lower walls 1 and 2 are provided with equal numbers of grooves 6 which face one another so that slides such as 7 can be inserted therein.

The slides 7 can be inserted into or removed from such a tray via either of the open sides of the tray. The tray is symmetrical about a longitudinal plane which passes through the middles of the grooves 6. The slides 7 are prevented from dropping out of the tray by two flaps 8 and 9 hinged on the upper surface 1. In FIG. 1, the flap 9 is raised and allows the insertion of a slide 7 into the tray or its removal therefrom on the side of the flap 9. In contrast the flap 8 is closed, preventing insertion or removal of a slide on the other side of the tray.

Figure 2:
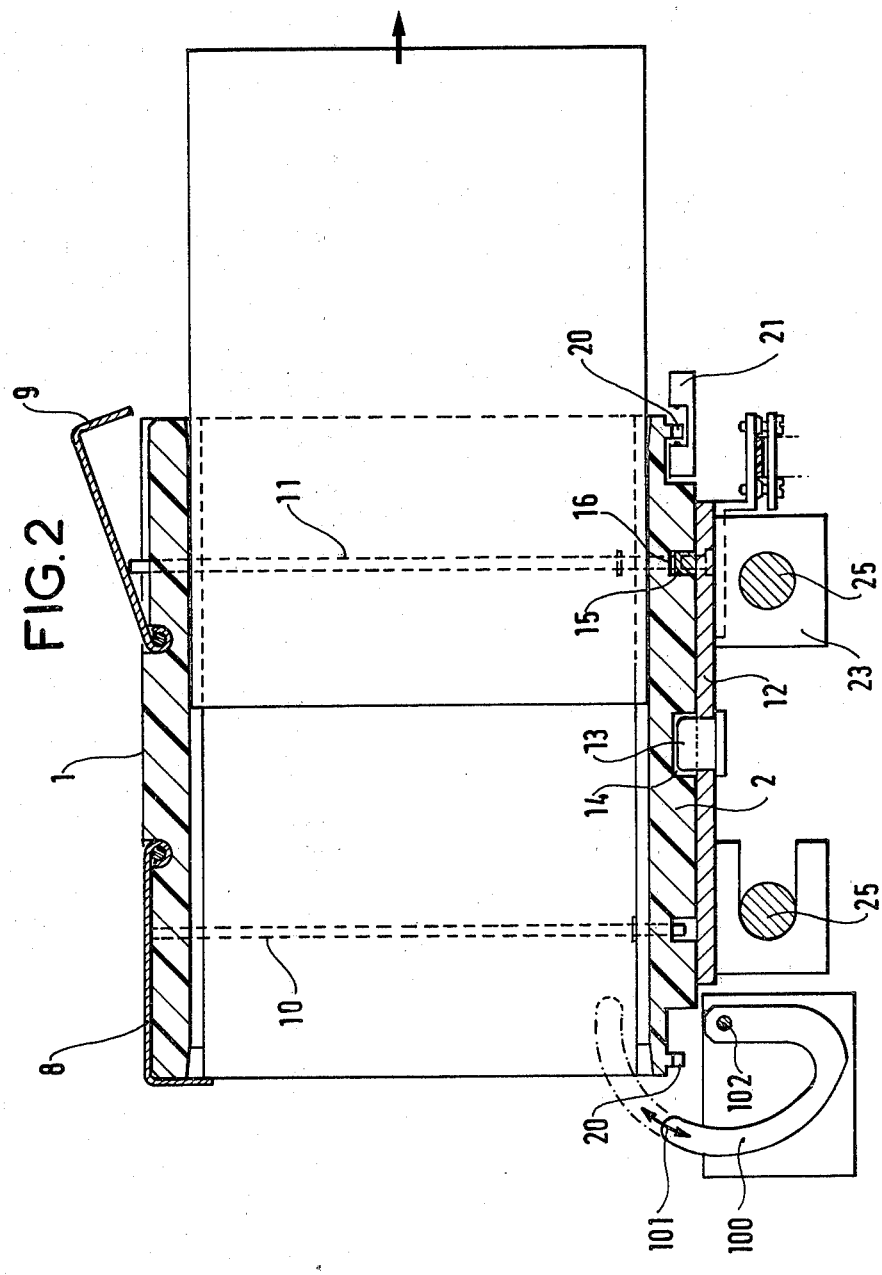
FIG. 2 is a transverse cross-section through the tray in position on a slide viewer.

FIG. 2 is a transversal cross-section through the tray placed on a carriage of a viewer for displaying the slides. The tray is equipped with two rods 10 and 11 for lifting the flaps 8 and 9 respectively. In the example described the push rods are located near to the back surface 3 of the tray, but clearly equivalent rods could be located instead, or in addition, near to the front wall 4.

These rods pass through the upper and lower walls and their upper ends bear against the flaps. When the tray is being installed on a carriage 12 of a slide viewer, it is positioned by means of a stud 13 on the carriage, which stud fits into a locating hole 14 in the lower wall 2 of the tray. At the same time, a rib 15 on the carriage enters a groove 16 in the tray lower wall 2. The rod 11 projects into the groove 16 and is lifted to open the flap 9 by coming into contact with the rib 15.

Figure 3:
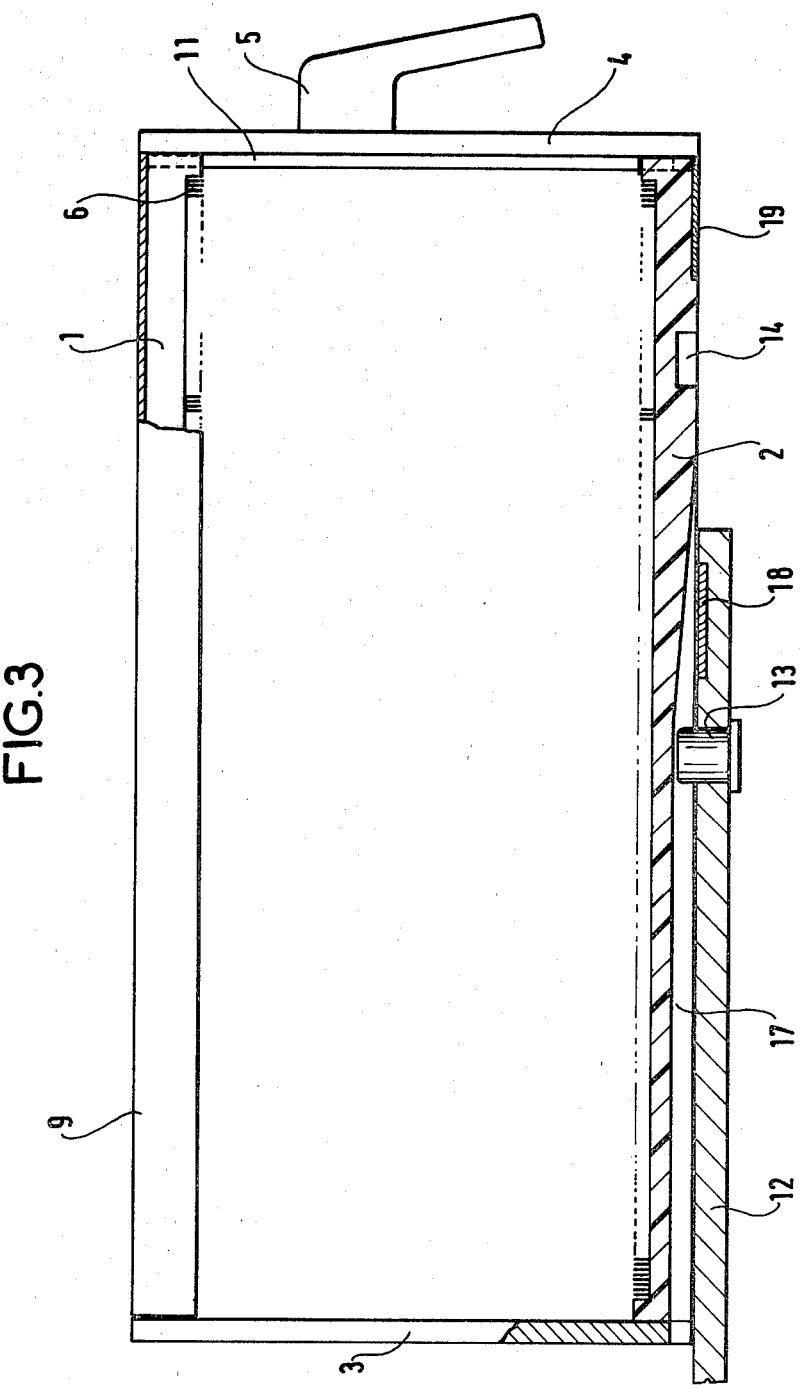
FIG. 3 illustrates the same tray in an intermediate position on a carriage with the may half installed and half removed, and showing also a positioning device.

FIG. 3 shows a tray half way along the carriage of a viewer, with the stud 13 and the hole 14. The tray is guided by a groove 17 in which the stud 13 slides. The groove 17 ends in an inclined plane near to the hole 14. This figure also shows a device for locking the tray in position on the carriage. The device consists of a magnet 18 on the carriage and of a pole piece 19 on the tray (or vice versa). Such a locking device is necessary to ensure the positioning accuracy required for microfiches, where the spacing between one microfiche and the next is about one millimeter, because otherwise the play between the stud 13 and the hole 14 is inevitably too large. As illustrated in FIGS. 1 and 2, the tray has a notched portion 20 on each slide so that the tray position can be located exactly. This notched portion is operatively associated with photo electric means, one of whose components 21 is shown in FIG. 2.

Figure 4:
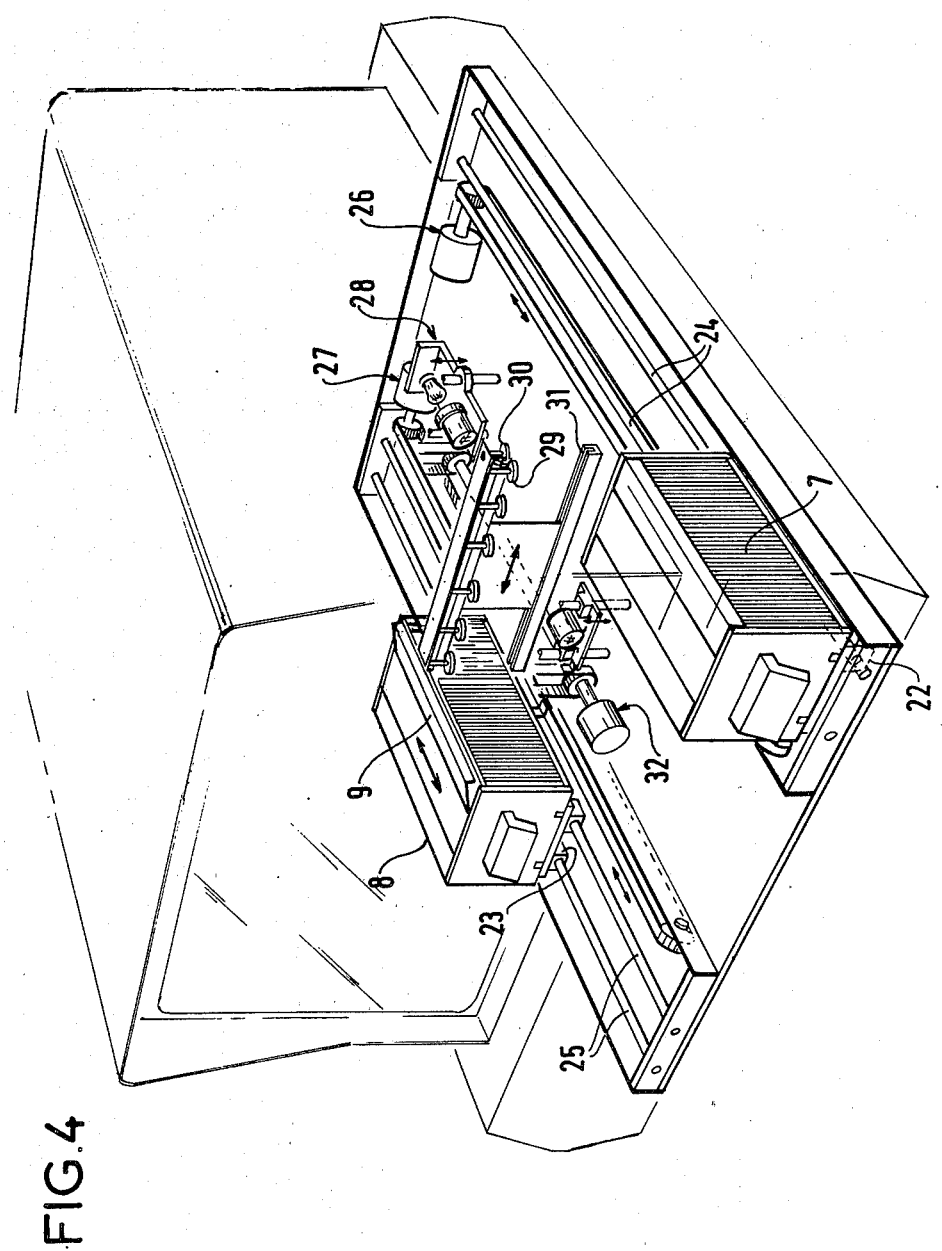
FIG. 4 is a general perspective view of a slide viewer.

FIG. 4 is a general perspective view of a slide viewer. The viewer includes two carriages 22 and 23 each of which can accommodate one tray. The carriages are placed on guide rods 24 and 25 and include means 26, 27 for moving them in translation along the rods. The two tray support, guide and drive systems are placed symmetrically about an optical system 28. The viewer also includes means for removing the slides from the trays and means for moving the slides horizontally and placing them in front of the optical system. A U-shaped member 100 is pivoted at one end at 102 to rotate the other end as indicated by arrow 101 into the open side of tray 1 to remove a slide 7 from the opposite open side of the tray to the dotted line position. These horizontal movement means include a double row of rotating rollers 29 and 30 at least one row of which is a drive row. These two rows are capable of straddling a slide in the neighbourhood of its upper edge and a stationary horizontal slideway 31 in which the lower edge of the slide engages. The optical system 28 includes vertical movement means 32.

Figure 5:
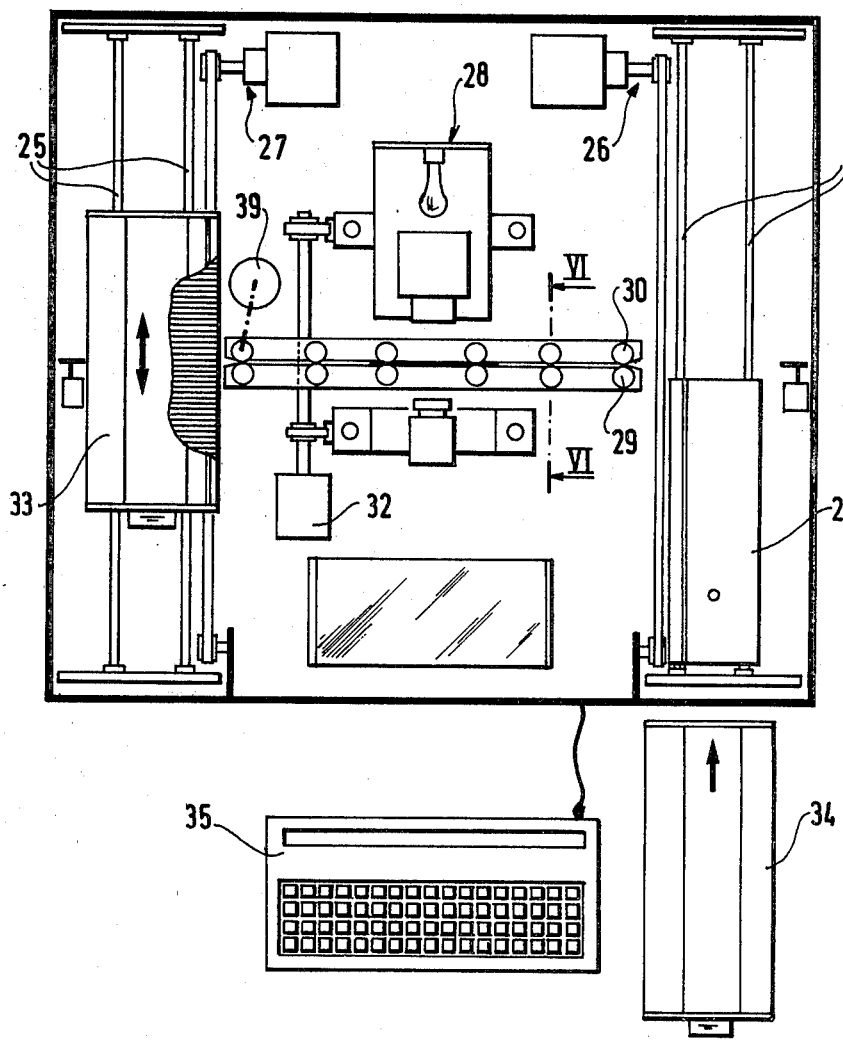
FIG. 5 is a top view of the slide viewer.

FIG. 5 is a top view of the viewer with a tray 33 in the operating position on the left-hand carriage 23 which it hides in the figure, whereas the right-hand carriage 22 has no tray. A tray 34 is shown in the front of the machine, opposite the right-hand carriage. A control console 35 is connected to the viewer and allows its operation to be controlled in accordance with requirements.

The fact that two trays can be placed simultaneously, one on the right-hand carriage of the viewer and the other on the left-hand carriage of the viewer, is particularly advantageous since it allows a trayfull of unclassified slides to be classified by inserting them into an empty tray in accordance with a preset program. To provide for this possibility, it is necessary to produce a symmetrical viewer and symmetrical trays which can be placed at will in the right hand side of the viewer or in the left hand side without turning the tray round so that the slides are always set the right way round. The handles 5 of the trays serve as fool-proof means for preventing the trays being inserted the wrong way round.

When a slide is being viewed the two rows of rollers 29, 30 which straddle the slides are moved apart by means of a device illustrated in FIG. 6. This device is triggered when a mark on the slide passes in front of a detector, not shown provided for this purpose in the viewer. FIG. 6 also shows one of the drive rollers 30, the other drive rollers being aligned perpendicularly to the plane of the figure. These rollers 30 are mounted on shafts such as 36 which are parallel to one another. They are made to rotate by gears such as gear 37, belt 38 and a motor 39 which is illustrated in FIG. 5.

The row of moving rollers such as 29 is suspended from supports such as 40 fixed on a shaft 41 on which a lever 42 is also fixed. A return spring 43 fixed on the lever and on a fixed portion of the viewer opposes the pull of an electromagnet 44.

When a slide such as slide 45 is placed so that is can be viewed, the rod 46 of the electromagnet moves back and the spring 43 urges the rollers 29 to the position shown in broken lines. The slide then rests freely by its lower edge in the bottom of the stationary slideway 31 and is therefore not subject to bending or folding forces.

I claim:

1. A tray for storing and classifying slides, said tray comprising:
    parallel, plane, top and bottom members held in fixed relationship to each other,
    said parallel, plane, top and bottom members being provided with corresponding facing sets of transverse, slide-receiving grooves,
    said tray being symmetrical about a longitudinal plane passing through the mid points of both sets of grooves and having open left and right sides via which slides may be inserted in or removed from the tray, and
    two, symmetrically disposed, independently movable side flaps pivotably mounted on at least one of said top and bottom members,
    each side flap having a first, open position in which it allows slides to be inserted or removed via its side of the tray, and a second, closed position in which it prevents insertion or removal of slides.

2. A tray according to claim 1, for operative association with a slide viewer including a tray support with said tray support further including flap-operating means,
    said tray being further provided with a push rod which extends through the bottom member of said tray and which operatively engages a flap and being positioned on said tray so as to be engageable by said flap-operating means provided in the viewer's tray support.

3. A tray according to claim 2, wherein the tray support comprises a stud and a permanent magnet, and said tray further comprises first and second positioning means for locating the tray on the viewer's tray support, said first positioning means comprising a co-operating stud-receiving socket for coarse positioning of said tray; and said second positioning means comprising a co-operating metal plate mounted to the bottom member and positioned so as to overlay the permanent magnet for holding the tray firmly on the support against the play inherent in the stud and socket.

4. A viewer for reading slides disposed in trays employed in storing and classifying slides, each of said trays comprising parallel, plane, top and bottom members held in fixed relationship to each other, said parallel, plane, top and bottom members being provided with corresponding facing sets of transverse, slide receiving grooves, each of said trays being symmetrical about a longitudinal plane passing through the midpoint of both sets of grooves and having open left and right sides via which said slides may be inserted or removed from the tray, and two symmetrically disposed, independently movable side flaps pivotably mounted to at least one of said top and bottom members, each side flap having a first, open position in which it allows slides to be inserted or removed via its side of the tray, and a second, closed position in which it prevents insertion or removal of said slides, said viewer including oprical means, two carriages, each of said carriages accommodating one tray, said carriages being mounted for movement in translation along two parallel paths disposed on either side of said optical means, said viewer further including means for removing the slides from the trays and for moving said slides horizontally past the optical means, from one tray to the other, together with means for moving the optical system vertically past the slide.

5. A viewer according to claim 4, wherein said means for horizontally moving a slide includes two rotatable roller rows, means for driving at least one of said rotatable roller rows, means for mounting said rotatable roller rows relative to said trays such that said two rotatable roller rows straddle a slide in the neighbourhood of its upper edge, and a stationary horizontal slideway in which the lower edge of the slide is engaged during slide movement horizontally past said optical means.

6. A viewer according to claim 5, wherein said rotatable roller rows comprise rotatable rollers, and said viewer further comprising means for moving the rotatable rollers of said rotatable roller rows apart to terminate movement of a slide and to facilitate viewing of the slide by said optical means.

* * * * *